United States Patent [19]
Michel

[11] 3,792,395
[45] Feb. 12, 1974

[54] ELECTRICAL INDUCTIVE APPARATUS HAVING SHEET AND STRAP WOUND WINDINGS

[75] Inventor: George P. Michel, South Boston, Va.

[73] Assignee: Westinghouse Electric Corporation, Pittsburgh, Pa.

[22] Filed: Apr. 3, 1973

[21] Appl. No.: 347,509

[52] U.S. Cl..................... 336/5, 336/150, 336/223
[51] Int. Cl. ............................................ H01f 21/12
[58] Field of Search ........... 336/5, 10, 12, 150, 223; 323/435

[56] References Cited
UNITED STATES PATENTS
3,113,281  12/1963  Ayers.................................. 336/150
3,484,727  12/1969  Weber et al. .................. 336/150 X FOREIGN PATENTS OR APPLICATIONS
1,264,600  3/1968  Germany ............................ 336/150
1,264,836  5/1961  France ............................... 336/150

Primary Examiner—Thomas J. Kozma
Attorney, Agent, or Firm—J. R. Hanway

[57] ABSTRACT

A power distribution transformer having a multiple section high-voltage winding. At least one section is wound from sheet conductor material. Another section is wound from strap conductor material and is disposed concentrically around the sheet wound section. Tap leads are attached to the strap wound section and are connected to tap changing apparatus. The setting of the tap changing apparatus determines the extent to which the strap wound section is connected in series with the sheet wound section, and thus determines the voltage rating of the high-voltage winding.

4 Claims, 4 Drawing Figures

PATENTED FEB 12 1974  3,792,395
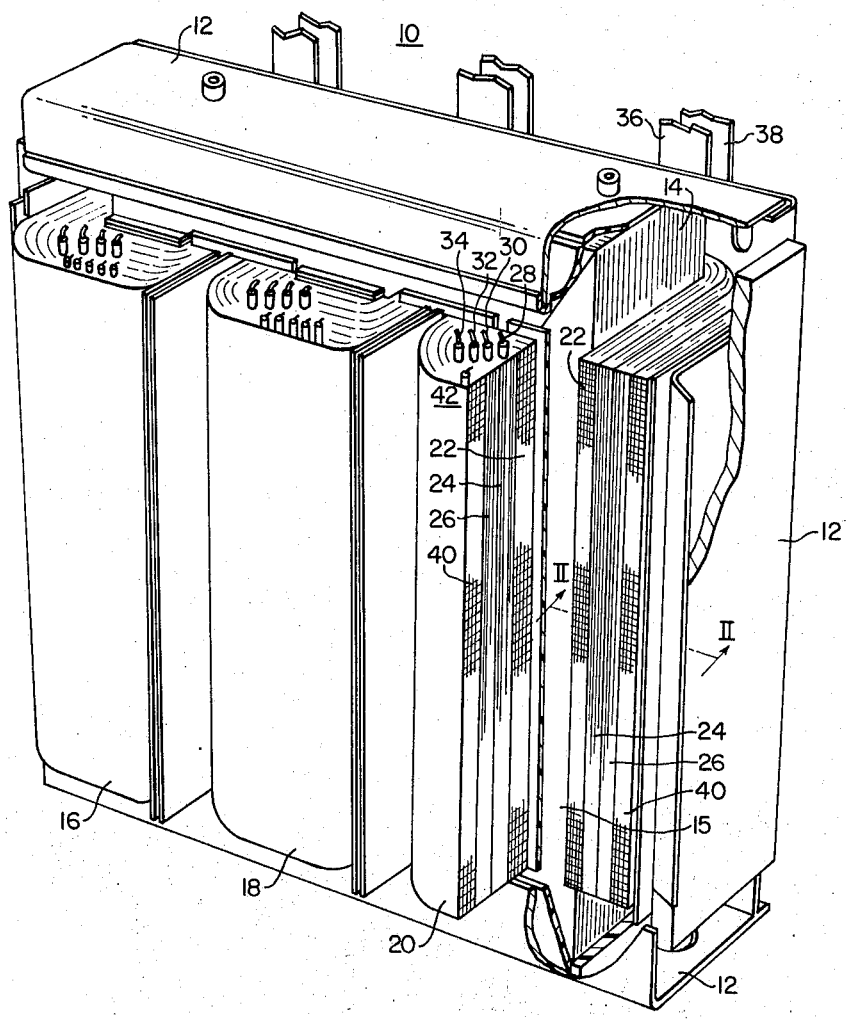
FIG. 1.
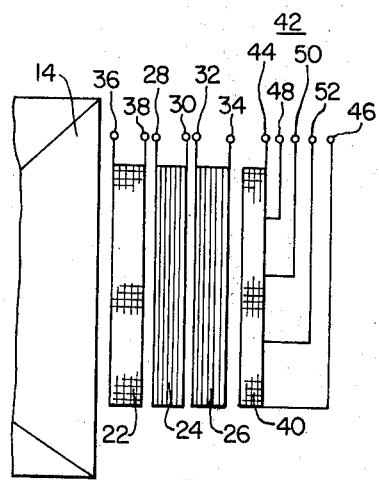
FIG. 2.
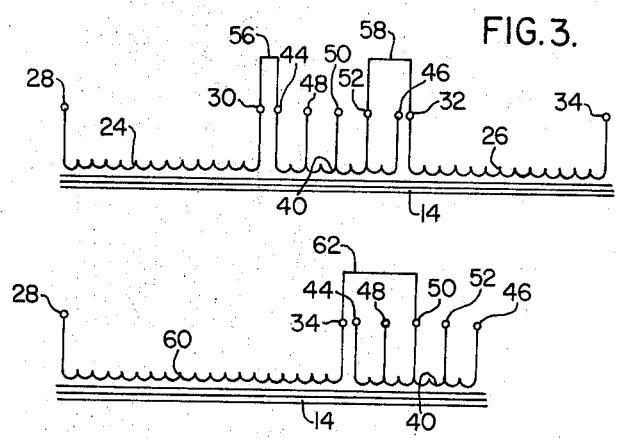
FIG. 3.
FIG. 4.

ELECTRICAL INDUCTIVE APPARATUS HAVING SHEET AND STRAP WOUND WINDINGS

BACKGROUND OF THE INVENTION

1. Field of the Invention

This invention relates, in general, to electrical inductive apparatus and, more specifically, to transformer winding structures.

2. Description of the Prior Art

Power transformers frequently have a winding thereof tapped so that the voltage rating can be changed conveniently. Normally, the tap leads are connected directly to the winding of the transformer in which the voltage rating is to be changed. In power distribution transformers, the high-voltage winding is often the winding which requires a voltage rating change due to variations in feeder line voltages. Thus, it is necessary to provide tap leads connected to the high-voltage winding.

Sheet or foil windings are widely used for the high-voltage windings of distribution power transformers due to their excellent mechanical characteristics and for other advantageous reasons. However, connecting tap leads to sheet conductors is relatively complicated and requires special techniques. Therefore, it is desirable, and it is an object of this invention, to provide a transformer having a high-voltage winding structure which is substantially wound from sheet conductors and which can be conveniently connected to tap leads.

Sheet windings contain at least one foil layer spirally wound around the preceding turn of the foil layer. Since the inner turns of the foil layer are inaccessible when the winding is completely wound, tap leads must be connected to the winding during the construction process. This technique requires considerable time and presents difficulties in insulating the tap lead as it is brought axially to the outside of the winding. Therefore, it is also desirable, and it is another object of this invention, to provide a transformer which has a primary winding substantially wound from sheet conductor and which is easily tapped after the sheet conductors have been wound.

SUMMARY OF THE INVENTION

There is disclosed herein a new and useful transformer having a novel arrangement for tapping the sheet or foil winding of the transformer. In one embodiment, the sheet winding is wound into two sections which are substantially concentrically disposed about a common axis. A tapped winding wound with strap conductors is also concentrically disposed around the common axis and around the outside of the sheet windings. Tap leads and end leads are attached to the tapped winding and are connected to the sheet winding sections by suitable jumpers or tap changer contacts to electrically place the tapped winding between the sheet winding sections. In another embodiment, the sheet winding has only one section and the tapped winding is electrically connected to an end of the sheet winding. In both embodiments, all of the tap leads are attached to the strap winding. The strap winding is physically located on the outside of the sheet windings where the taps can be made conveniently. This positioning of the tapped winding also places it outside of the high leakage flux region, thus minimizing the impedance change as the tap position is changed.

BRIEF DESCRIPTION OF THE DRAWING

Further advantages and uses of this invention will become more apparent when considered in view of the following detailed description and drawing, in which:

FIG. 1 is a view of a transformer constructed according to this invention with a portion of a winding structure cut-away for clarity;

FIG. 2 is a sectional view, shown schematically, taken generally along the line II—II of FIG. 1;

FIG. 3 is an electrical schematic diagram of the transformer shown in FIG. 1; and FIG. 4 is an electrical schematic diagram of a transformer constructed according to an embodiment of this invention.

DESCRIPTION OF THE PREFERRED EMBODIMENTS

Throughout the following description, similar reference characters refer to similar elements or members in all the figures of the drawing.

Referring now to the drawing, and to FIG. 1 in particular, there is shown a power distribution transformer 10 constructed according to this invention. The frame structure 12 encloses and supports a three-phase magnetic core 14 having three core legs, such as core leg 15. Around the legs of the magnetic core 14 are disposed the winding structures 16, 18 and 20.

The cut-away portion of FIG. 1 illustrates the details of the winding structure 20. Winding structures 16 and 18 are constructed similar to the winding structure 20. A low-voltage winding 22 is constructed of a plurality of turns of a suitably shaped conductor. Either sheet or strap conductor material may be used with appropriate insulating material disposed between the turns of the conductor. The conductor is wound around the leg 15 of the magnetic core 14.

A high-voltage winding section 24 is constructed of a plurality of turns of a foil or sheet conductor. A high-voltage winding section 26 is similarly constructed. The high-voltage winding section 24 is wound around the low-voltage winding 22 and the high-voltage winding section 26 is wound around the high-voltage winding section 24. The high-voltage winding may comprise only one sheet wound section in particular types of transformers, such as transformers which will have the high-voltage windings connected only in a wye arrangement. Leads 28 and 30 are connected to winding section 24 and leads 32 and 34 are connected to winding section 26. The leads 36 and 38 are connected to the winding section 22.

A tapped high-voltage winding 40 is constructed of a plurality of turns of a strap conductor wound around the winding section 26. The turns may spiral in an axial direction with a radial build equal to the thickness of one strap, or in a radial and axial direction with a radial build equal to the thickness of several straps. The leads 42 are connected to tap and end terminals on the tapped winding 40.

Using a sheet conductor for the major part of the high-voltage winding permits the advantages for which sheet conductors offer, such as excellent short circuit strength. Using a strap conductor for the tapped portion of the high-voltage winding permits easy connection of the tap leads to the tapped winding 40.

Foil or sheet conductors are relatively thin compared to strap conductors. In sheet conductors, the thickness of the sheet is substantially less than the axial height of the sheet. In strap conductors, the conductor dimensions along the axial and radial directions of the windings are of the same order of magnitude, with such dimensions usually having a ratio of less than ten.

FIG. 2 is a view, shown schematically, taken generally along the line II—III of FIG. 1. The leads 44 and 46 are connected to the ends of the tapped winding 40. Leads 48, 50 and 52 are connected to tap terminals on the winding 40. Since winding 40 is located on the outside of the winding structure 20, the tapped winding 40 is readily accessible for making the tap connections.

The end and tap leads 42 are illustrated in FIGS. 1 and 2 as being brought to the top of the winding structure 20 for connection to suitable jumpers or to tap changing apparatus. It is within the contemplation of this invention that the leads 42 may project from the winding structure 20 in other places, such as along the outside of the winding structure 20 near the position where the lead is connected to the winding 40. The leads 28 and 34 of the high-voltage windings 24 and 26 are line leads which are normally connected to, or electrically close to, the high-voltage line.

FIG. 3 is a partial schematic diagram of the transformer shown in FIGS. 1 and 2. As is best shown in FIGS. 1 and 2, the winding 40 is physically positioned around the outside of the high-voltage winding in a relatively low leakage flux region. However, electrical considerations, such as surge voltage strength, make it desirable to locate the winding 40 electrically near the center of the high-voltage winding as shown in FIG. 3.

FIG. 3 illustrates the electrical jumper connections required to provide a voltage rating which is one step below the maximum voltage rating. Jumper connections 56 and 58 normally are provided by a tap changer connected to the leads. Changing the voltage rating involves changing the position of one or both of the jumper connections in a manner well known in the art.

FIG. 4 is a partial schematic diagram of a transformer having a winding arrangement constructed according to another embodiment of this invention. When a transformer will be only wye-connected, it is acceptable practice to place the tapped winding near the common end of the high-voltage winding. Such placement does not subject the tapped winding to surge voltages near the line end of the winding since the common end of the winding is not connected to the high-voltage line. In FIG. 4, the high-voltage winding 60 has only one winding section, thus no intermediate leads are required. Winding 40 is physically positioned as shown in FIGS. 1 and 2. However, according to the embodiment shown in FIG. 4, winding 40 is electrically connected to the end of the high-voltage winding 60 by a suitable tap changer or by a suitable jumper connection 62. Other taps may be connected by the jumper connection 62 to provide a different voltage rating.

The embodiments of this invention provide a convenient and functional manner for constructing a high strength, high-voltage winding for a power distribution transformer. Although described with reference to a primary high-voltage winding, the invention applies equally to low-voltage secondary windings and to secondary windings of "step-up" transformers. Since numerous changes may be made in the above-described apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. Electrical inductive apparatus comprising:
   a magnetic core;
   a low-voltage winding disposed around a leg of said magnetic core;
   a high-voltage winding comprising a conducting sheet wound around said low-voltage winding to form a plurality of winding turns;
   a tapped high-voltage winding comprising a conducting strap wound around said high-voltage sheet wound winding to form a plurality of winding turns; and
   a plurality of tap leads connected to said tapped high-voltage winding and being suitable for connection to the high-voltage sheet wound winding;
   said low-voltage, high-voltage sheet wound, and tapped high-voltage windings being disposed substantially concentrically with each other and around said leg of said magnetic core.

2. The electrical inductive apparatus of claim 1 wherein the high voltage sheet wound winding is divided into first and second sections with the tapped high-voltage winding being connectable electrically between said first and second high-voltage sheet wound winding sections.

3. The electrical inductive apparatus of claim 1 wherein the magnetic core includes first, second and third legs, each of said legs having disposed concentrically therearound a low-voltage winding, a high-voltage sheet wound winding, and a strap wound tapped high-voltage winding.

4. A power transformer comprising:
   a three-phase magnetic core having first, second and third legs;
   first, second and third low-voltage windings wound around said first, second and third legs, respectively;
   first, second and third sheet wound high-voltage winding sections wound around said first, second and third low-voltage windings, respectively;
   fourth, fifth and sixth sheet wound high-voltage winding sections wound around said first, second and third high-voltage winding sections, respectively;
   first, second and third strap wound tapped high-voltage windings wound around said fourth, fifth and sixth sheet wound high-voltage winding sections, respectively;
   line terminals connected to said first, second, third, fourth, fifth and sixth sheet wound high-voltage winding sections;
   end terminals and at least one tap terminal connected to said first, second and third tapped high-voltage windings; and
   means for connecting said line, end and tap terminals together to change the voltage rating of the transformer.

* * * * *